Feb. 26, 1952  K. B. BLODGETT  2,587,282
STEP GAUGE FOR MEASURING THICKNESS OF THIN FILMS
Filed Feb. 27, 1951
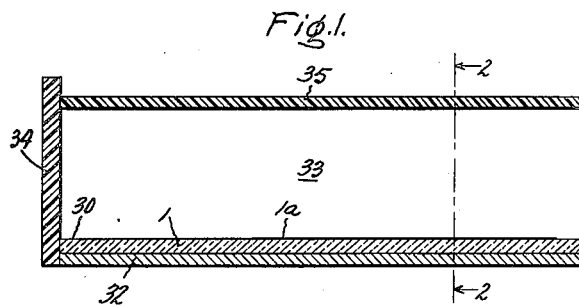
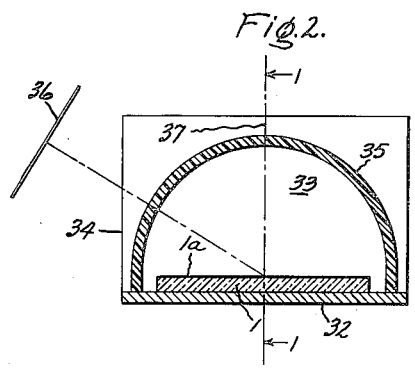
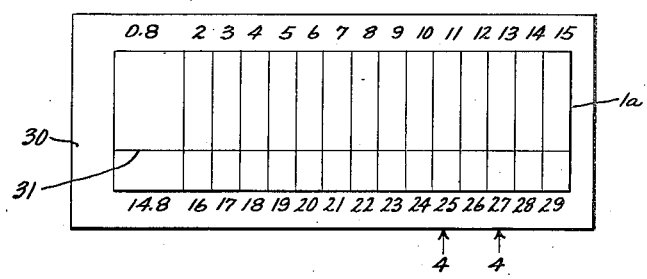
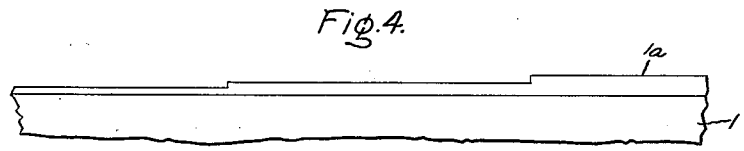
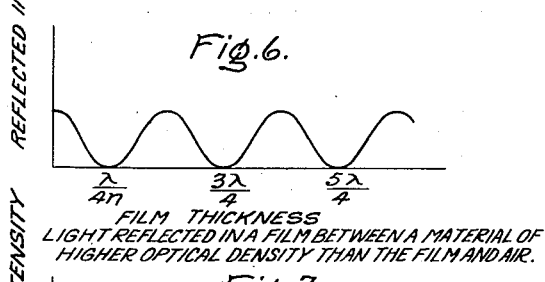
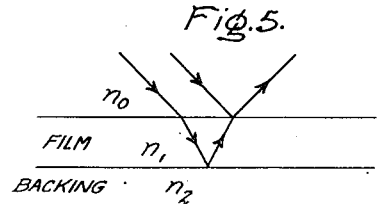
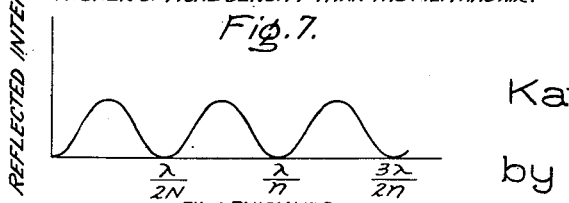
Inventor:
Katharine B. Blodgett,
by Paul G. Frank
Her Attorney.

Patented Feb. 26, 1952

2,587,282

UNITED STATES PATENT OFFICE 2,587,282

STEP GAUGE FOR MEASURING THICKNESS OF THIN FILMS

Katharine B. Blodgett, Schenectady, N. Y., assignor to General Electric Company, a corporation of New York Application February 27, 1951, Serial No. 212,968

3 Claims. (Cl. 88—14)

My invention relates to optics and has for an object the provision of a device for measuring the thickness of very thin films of transparent material capable of reflecting interference colors.

Films of dielectric materials having equal optical thickness reflect light of the same color or a complementary color from a common light source depending upon the refractive indices of the films and the mediums bordering the films. A method of measuring the thickness of such a film, therefore, is to compare the colors reflected by the film with the colors reflected by stratified films of known thickness prepared by the method described in my U. S. Patent 2,220,860 granted November 5, 1940. Another object of my invention, then, is to provide a gauge having a coating of various graduated thicknesses of a film thereon with which to compare reflected colors of films, the thickness of which is to be determined.

A further object of my invention is to provide a gauge from which colors are reflected vividly to be easily compared to reflected light from thin transparent films.

In carrying out my invention, a base member of polished X-ray shield glass treated with hot hydrogen is provided with a coating of barium stearate separated into graduated steps of known thicknesses to form a gauge. When it is required to determine the thickness of a film, the gauge and the film are exposed to light from a single source, and the color reflected from the film and the matching or complementary color from a step of the gauge are compared. The thickness of the film is proportional to the index thickness of the step from which the compared color is reflected.

For better understanding of my invention, reference is made to the following description and the accompanying drawings of a particular application of my invention in which Fig. 1 is a sectional elevation view of a measuring device incorporating a gauge built according to my invention taken on the line 1—1 of Fig. 2 looking in the direction of the arrows; Fig. 2 is a sectional view of the measuring device of Fig. 1 taken on the line 2—2 looking in the direction of the arrows including a polarizing viewing film illustrating the positional relationship of the viewing film to the gauge; Fig. 3 is a plan view of the interior of the measuring device shown in Fig. 1; Fig. 4 is an enlarged side elevational view of a portion of the gauge shown in Fig. 3 along the edge 4—4 looking in the direction of the arrows; Fig. 5 is a typical diagram of the path of light rays due to interference in a thin film; Figs. 6 and 7 are graphs of the intensities of reflected light from films bordered on one surface by air and on the other surface by materials of higher and lower optical densities respectively.

According to the drawing, a surface of a plate 1 of X-ray shield glass which contains approximately 61 percent of lead oxide is blackened by treating the glass with hot hydrogen. Glass of this composition is readily blackened to such a density that the disk of the sun is invisible through it.

An additional phase change in light rays that occurs due to blackening the surfaces of a glass plate may be indicated by an index number equal to the thickness in microinches of a coating of barium stearate upon a material of higher refractive index causing an equal phase change as light traverses a return trip therethrough. For particular plates, these values vary from 0.8 to 1.2 microinches. Such a phase change is characteristic of the reflection of light by a metal, denoting that lead oxide in the surface of the glass is reduced to metallic lead by the hot hydrogen. Plate 1 as shown in the drawing has an index number of 0.8 microinch.

Equal steps numbered 2 to 15 in Fig. 3 along corresponding ends of the steps are provided upon plate 1. The opposite ends of the steps are numbered 16—29. A coating of barium stearate 1a is built up upon plate 1 in steps having thicknesses in microinches corresponding to the numbers by the dipping process described in U. S. Patent 2,220,860 noted above. A coating of barium stearate of 14 microinches thickness is applied to plate 1 from the ends of the steps marked 16 to 29 in Fig. 3 to a median line 31 by the same dipping process with the longitudinal axis of plate 1 held parallel to the surface of the dipping bath. A backing plate 30 to support plate 1 is cemented thereto before or after the dipping process and is provided with index numbers adjacent the corresponding steps.

The uncoated portion of blackened glass adjacent step 2 is provided with an index number corresponding to the thickness in microinches of a coating of barium stearate upon a substance of higher refractive index and causing an equal phase change in light which in the gauge shown in Fig. 3 is 0.8. The index number of the portion adjacent step 16 is 14.8.

As shown in Fig. 6, the intensities of light reflected from a film bordered by a material of higher optical density is plotted with relation to thickness of the film. When perpendicular monochromatic light is reflected from the steps of the gauge, the intensity of the light reflected diminishes with increasing step thickness to a minimum at the thickness marked $$\frac{\gamma}{4n}$$

In the equation $$t=\frac{\gamma}{4n}$$

where λ is the wave-length of sodium light (the mean of the sodium light D-lines 5890 and 5896 A. U.) and $n=1.491$, the refractive index of barium stearate, $t=988$ A. U. or approximately 4 microinches (within 3 per cent) showing that minimum intensity of reflected light occurs at step 4 of the gauge. The difference in thicknesses of adjacent whole numbered steps is 10 monolayers of barium stearate which is equal to 244 A. U. or within 4% of 1 microinch.

To achieve a maximum vividness of color reflected by a film, the reflectivities of the exposed surface of a film (film-air boundary) and the opposite surface of the film (film-base boundary) must be equal. Step 4 of the gauge was found to be black when viewed by perpendicular sodium light, and even when the source was a 6,000 lumen sodium lamp no image of the lamp was reflected by this step indicating that the reflectivities at the two surfaces of the barium stearate layers of the gauge are equal.

Plate 30 is mounted upon a base 32 of a transparent plastic case 33 having ends 34 and a cover 35 which is curved to reduce undesirable light reflections when the gauge is used. The case is provided to protect the relatively soft barium stearate coating.

When white light is directed at the gauge, the light reflected by each step is white light from which a wavelength of light corresponding to a color is removed by interference in the film with the wavelength of that particular color. The color of the reflected light, therefore, is not pure but is complementary to the color that is removed. For example, the color of light reflected from a step that reflects no green is a vivid red.

The colors reflected by steps 2 to 7 are what are known in optics as "first interference order" colors and those reflected by steps 8 to 15 are known as "second order" colors. Steps 16 to 23 reflect third order colors. There are higher orders than those seen on the gauge but they are less vivid. After the third order, the colors reflected are dull reds and greens only, which become progressively less distinct in the higher orders.

The first three orders begin with brown-yellow or yellow for the reason that the complementary blue light has the shortest wavelength in the visible spectrum so the step that fails to reflect blue is the thinnest step of each order.

The film thickness, at which a reflected color of an order appears, varies with $1/\cos r$ where $r$ is the angle of refraction of light in the coating. As the angle of incidence $i$ is increased from $i=0$ degrees to angles near grazing coincidence with the coating, for example at $i=75$ to 85 degrees, the angle of refraction $r$ increases and $\cos r$ diminishes.

As the step gauge illuminated by white light is rotated slowly from a position in which the light is perpendicular to the gauge surface to the position of grazing light, a particular color reflected from one of the steps shifts to be reflected from successive steps of greater thickness. The colors shift so that $t \cos r$ is a constant for a given color, where $t$ is the index thickness of a step. The thicknesses of the steps reflecting the second order of colors are three times the thickness of the steps reflecting similar colors in the first order so that a reflected color from a second order series shifts three times as far as the similar color in the first order for the same change in the angle of incidence.

To determine the order of a color reflected from a film, the gauge and the film are illuminated by the same white light and rotated simultaneously. The order of the color reflected by the film is the same as that of the gauge step reflecting the same color change during rotation. The true film thickness can then be calculated by multiplying the index thickness of the step by the ratio of the refractive index of barium stearate to that of the film.

It is well known in the theory of optics that the colors reflected by thin films on the surfaces of materials depend upon the phase changes that occur at the boundaries of the films.

In the case of dielectric materials, light reflected back from a denser into a rarer medium undergoes a phase change of 180° while light reflected back from a less dense into a more dense medium undergoes zero phase change. These two conditions give rise to two series of interference colors which I designate respectively as the "dark" and "light" series.

Fig. 5 of the drawing is a typical diagram of the path of light rays due to interference in a thin film. The symbols $n_0$, $n_1$ and $n_2$ of the diagram are the refractive indices respectively of the medium above the film, usually air, the film and the backing material of the film.

The diagram of Fig. 6 is a plot for the reflected intensity for monochromatic light for the condition $n_0 < n_1 < n_2$, comprising the dark series. In this case, the reflected intensity has a maximum value for zero film thickness and as the film thickness increases to $$t=\frac{\lambda}{4n_1}$$

where λ is the wavelength of the monochromatic light, the reflected intensity diminishes. An example of this series is a coating of magnesium fluoride deposited upon glass since the refractive index of magnesium fluoride is 1.38 and of lime glass 1.51 approx. The minima of the curve have zero intensity only when reflectivities of the film surfaces are equal.

To measure the thickness of a film imposed upon a material having a higher refractive index than the film, the film and the step gauge are mounted side by side beneath a light source to be viewed at the same angle between 0° and Brewster's angle. The index number of the step having a reflected color matching that of the film is multiplied by the ratio of the refractive indices of barium stearate to that of the film to determine the thickness of the film.

Figure 7 is a plot of the reflected monochromatic light for the bright series which includes either of the conditions $n_0 < n_1 > n_2$ which is the case of the wall of a soap bubble or an oil film on water, or $n_0 > n_1 < n_2$. In the latter example, $n_0$ refers to an oil such as Aroclor having a refractive index greater than that of barium stearate and in which a step gauge can be immersed. For either of these conditions, the intensity of reflected light is minimum when the film thickness is zero and increases as film thickness increases to $$t = \frac{\lambda}{4n_1}$$

An example of a film reflecting the bright series is zinc sulfide with a refractive index of 2.36 deposited on lime glass. As before, the minima have zero intensity when the film surface reflectivities are equal.

The colors reflected by a given optical thickness in the two series are exactly complementary when illuminated by white light. The step gauge described herein may measure both the dark and the light series by the use of polarized light.

It is well known in the theory of optics that when a polarized ray has its electric vector parallel to the incident plane and as the angle of incidence of this ray to a plane surface is increased, the amplitude of the reflected ray falls to zero at so-called Brewster's angle and then increases with a reversal of direction of amplitude at angles greater than Brewster's angle. Brewster's angle is the angle between the normal to a surface and a reflected ray whose tangent is equal to the index of refraction of the substance. When the ray is reflected by a thin film at an angle greater than Brewster's angle, the reversal of direction of amplitude occurs at the upper surface of the film, but never at the lower surface when the film is imposed on a material having a higher refractive index than the film, since refraction of light as it enters the film prevents it from reaching the lower surface at an angle as great as Brewster's angle. Therefore, at angles greater than Brewster's angle, a phase reversal occurs at one surface and not the other, so the series of colors follow the bright series.

This phenomenon can be demonstrated by viewing a barium stearate step gauge at angles a little greater than Brewster's angle through a sheet of polarizing film or a Nicol prism. When the polarizing film is rotated to a position in which the electric vector of the light transmitted by the polarizing film is perpendicular to the incident plane, the colors are seen to follow the dark series and when the electric vector is parallel to the incident plane, the colors follow the bright series.

The interference colors reflected by the steps vary with the angle of incidence so that a polarizing film 36 is mounted at a known angle to line 37 which is normal to the surfaces of the steps. A single calculation supplies the necessary correction to the color scale to account for the variation with the angle of incidence.

Barium stearate step gauges formed on unblackened X-ray shield glass reflect colors at angles greater than Brewster's angle that are not sufficiently bright to be useful. On blackened X-ray shield glass, they can be seen plainly. The amount of blackening, however, is not critical, since substantially all of the reflection of light occurs at or very close to the surface. Samples blackened in hydrogen until the transmission of light therethrough was diminished to approximately 20 percent caused films built on these samples to be as effectively vivid as those that were treated until they became dense black.

While I have illustrated and described a particular embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. In an instrument for determining the thickness of a transparent thin film mounted upon a medium having a greater refractive index than that of said film, a step gauge comprising a supporting base plate, a plate of glass having a composition including lead oxide, one surface of said glass being secured to a surface of said base plate and the opposite surface of said glass being blackened by contact with hot hydrogen and a coating of barium stearate covering said blackened surface and divided into regular areas having graduated thicknesses to provide steps having reflectivities equal to the reflectivities of predetermined thicknesses of barium stearate mounted upon unblackened glass, said base plate having index numbers thereon adjacent said steps to indicate the thicknesses of barium stearate corresponding thereto, whereby when said transparent film and said gauge are illuminated from a common source of white light the thickness of said transparent film in microinches equals the index number of the step reflecting the same color as said film multiplied by the ratio of the refractive index of said barium stearate to that of said film.

2. An instrument for determining the thickness of a transparent film mounted upon a medium of greater refractive index comprising a step gauge including a metallic base plate, a plate of glass having a composition including approximately 61 percent lead oxide, one surface of said glass being secured to a surface of said base plate and the opposite surface of said glass plate being blackened by contact with hot hydrogen, a coating of barium stearate covering said blackened surface and divided into regular areas having thickness to form steps having reflectivities equal to those of a coating of predetermined thicknesses of barium stearate on glass having a phase change 180° at the glass-film boundary, said base plate having numbers indexed thereon adjacent said steps respectively indicating said predetermined thicknesses and a transparent protective cover enclosing said gauge and said base plate, whereby the index number of the step of said gauge reflecting the same color of light as said film from a common white light source multiplied by the ratio between the indices of refraction of barium stearate and the material of said film equals the thickness of said film in microinches.

3. An instrument for determining the thickness of a transparent thin film comprising a step gauge including a metallic base plate, a plate of glass having a composition including substantially 61 percent lead oxide, one surface of said glass plate being secured to a surface of said base plate and the opposite surface of said glass plate being blackened by contact with hot hydrogen, a coating of barium stearate covering said blackened surface and divided into regular areas having thicknesses to form steps having white light interferences equal to those of a coating of a predetermined thickness of barium stearate on unblackened glass, said base plate having index numbers imprinted thereon adjacent said steps respectively indicating said predetermined thicknesses corresponding thereto, a transparent cover enclosing said gauge and said base plate and a thin strip of polarizing material disposed at a predetermined angle with the surface of said steps and rotatable in the plane thereof whereby when said gauge is illuminated from a light source of white light at an angle of incidence of substantially 60° and the electric vector of said polarizing strip is parallel to the plane of incidence of said ray, the product of the index number of the one of said steps from which a reflected color matches the color reflected from a film mounted upon a medium having a smaller index of refraction than the film and disposed perpendicularly to said white light source, the cosine of the angle of refraction of light in said barium stearate and the ratio between the refractive indices of said barium stearate and said film, equals the thickness of said film in microinches, and when a film is mounted upon a medium having an index of refraction greater than that of the film and said film and said gauge are illuminated at the same angle with the electric vector of said polarizing strip disposed perpendicularly to the plane of incidence of said light, the product of the index number of the one of said steps from which a reflected color matches the color reflected from said film and the ratio between the refractive indices of said barium stearate and said film equal the thickness of said film in microinches.

KATHARINE B. BLODGETT.

REFERENCES CITED

The following references are of record in the file of this patent:

UNITED STATES PATENTS

| Number | Name | Date |
|---|---|---|
| 2,094,158 | Luckiesh | Sept. 28, 1937 |
| 2,220,860 | Blodgett | Nov. 5, 1940 |
| 2,352,976 | Schaefer | July 4, 1944 |
| 2,384,204 | Sukumlyn | Sept. 4, 1945 |

OTHER REFERENCES

Waugh, David F.: "Method for Investigating the Thickness, Chemical Properties, and Surface Structure of Thin Biological Objects," published in Journal of the Optical Society, vol. 32, pages 492 to 502, September 1942. (Copy in Division 7.)